US011383772B2

(12) United States Patent
Göbel

(10) Patent No.: US 11,383,772 B2
(45) Date of Patent: Jul. 12, 2022

(54) REAR AIR GUIDE DEVICE FOR A VEHICLE

(71) Applicant: Audi AG, Ingolstadt (DE)

(72) Inventor: Theresa Göbel, Möckenlohe (DE)

(73) Assignee: AUDI AG, Ingolstadt (DE)

(*) Notice: Subject to any disclaimer, the term of this patent is extended or adjusted under 35 U.S.C. 154(b) by 39 days.

(21) Appl. No.: 17/058,086

(22) PCT Filed: Mar. 20, 2019

(86) PCT No.: PCT/EP2019/056950
§ 371 (c)(1),
(2) Date: Nov. 23, 2020

(87) PCT Pub. No.: WO2019/233648
PCT Pub. Date: Dec. 12, 2019

(65) Prior Publication Data
US 2021/0229758 A1 Jul. 29, 2021

(30) Foreign Application Priority Data
Jun. 4, 2018 (DE) .................... 10 2018 208 749.0

(51) Int. Cl.
*B62D 35/00* (2006.01)
(52) U.S. Cl.
CPC ................... *B62D 35/007* (2013.01)
(58) Field of Classification Search
CPC .................................................. B62D 35/007
See application file for complete search history.

(56) References Cited

U.S. PATENT DOCUMENTS

| 5,923,245 A | 7/1999 | Klatt et al. |
| 2006/0043770 A1* | 3/2006 | Preiss .................. B62D 35/007 |
| | | 296/180.1 |

(Continued)

FOREIGN PATENT DOCUMENTS

| DE | 19652692 C1 | 6/1998 |
| DE | 19902289 A1 | 7/2000 |

(Continued)

OTHER PUBLICATIONS

International Search Report and Written Opinion of the International Searching Authority directed to related International Patent Application No. PCT/EP2019/056950, dated Oct. 31, 2019, with attached English-language translation; 17 pages.

(Continued)

*Primary Examiner* — Lori L Lyjak
(74) *Attorney, Agent, or Firm* — Sterne, Kessler, Goldstein & Fox P.L.L.C.

(57) ABSTRACT

The present disclosure provides a rear air guide device for a vehicle. The rear air guide includes a first air guide element and a control device that moves the first air guide element between a first terminal position and a second terminal position such that the first air guide element prolongs a car body element of the vehicle. The first air guide element is pivotably mounted to the car body element such that first air guide element pivots between the first terminal position and the second terminal position. The rear air guide further includes a second air guide element coupled to the first air guide element. When the first air guide element is set at the second terminal position, the second air guide element spans a gap between the first air guide element and the car body element.

9 Claims, 2 Drawing Sheets

(56) References Cited

U.S. PATENT DOCUMENTS

2007/0236045 A1   10/2007   Froeschle et al.
2010/0026045 A1   2/2010   Thomas
2015/0274223 A1   10/2015   Wolf et al.

FOREIGN PATENT DOCUMENTS

| | | | | |
|---|---|---|---|---|
| DE | 19933435 A1 | * | 1/2001 | ............ B60R 9/06 |
| DE | 102008011179 A1 | | 8/2009 | |
| DE | 102008036283 A1 | | 2/2010 | |
| DE | 102008039480 A1 | | 2/2010 | |
| DE | 102014104157 A1 | | 10/2015 | |
| DE | 102015008474 A1 | | 1/2017 | |
| DE | 102015118072 A1 | | 4/2017 | |
| DE | 102016105994 A1 | | 10/2017 | |
| DE | 102016105082 A1 | * | 11/2017 | |
| DE | 102018213770 A1 | * | 2/2020 | |
| EP | 1840017 A1 | | 10/2007 | |
| EP | 2711254 B1 | * | 4/2017 | ............ B60S 1/58 |
| FR | 2972994 A1 | | 9/2012 | |
| FR | 2982568 A1 | | 5/2013 | |
| JP | H 0769248 A1 | | 3/1995 | |
| JP | H 07132863 A | | 5/1995 | |

OTHER PUBLICATIONS

International Preliminary Report on Patentability directed to related International Patent Application No. PCT/EP2019/056950, completed Apr. 23, 2020, with attached English-language translation; 11 pages.

* cited by examiner

REAR AIR GUIDE DEVICE FOR A VEHICLE

TECHNICAL FIELD

The invention relates to a rear air guide device for a vehicle as described herein.

BACKGROUND

Add-on parts for vehicles, in particular air guide elements or spoilers, which improve the flow around the vehicle or the aerodynamics of the vehicle, are known in numerous variations. In addition, corresponding air guide devices for vehicles having at least one air guide element are known, a control device moving the at least one air guide element between a first terminal position and a second terminal position.

DE 199 02 289 A1 discloses a generic air guide device with a movably mounted air guide element. In this case, the air guide element can be moved between a first terminal position and a second terminal position. In the first terminal position, the air guide element is arranged within the vehicle contour. In the second terminal position, the air guide element projects beyond the vehicle contour. The air guide element has a material which forms overlapping layers in the first terminal position. During the transition to the second terminal position, the overlapping layers can be canceled in favor of a stretched succession of the layers.

DE 10 2015 008 474 A1 discloses an air guide device which has at least one air guide element which is arranged in the region of a rear window of the vehicle. The at least one air guide element can be moved along a guide by means of at least one actuator, the length of the at least one air guide element being changeable in the transverse direction of the vehicle during a movement along the guide.

DE 10 2008 036 283 A1 discloses a rear air guide device which is arranged on a rear roof edge on a tailgate provided with a rear window. An upper inflow surface of the air guide device extends as a prolongation of the upstream roof upper side and the air guide device projects beyond an upper edge region of the rear window.

DE 10 2016 105 994 A1 discloses an air guide device in the rear region of a motor vehicle which comprises a spoiler, which can be converted from a rest position into an operating position, and vice-versa, by means of a control device. For this purpose, the spoiler is integrated in the rear region of the roof, wherein at least a part of the roof spoiler can be controlled translationally beyond the roof end by means of the control device.

DE 10 2015 118 072 A1 discloses an air guide device for a rear region of a vehicle, having a mounting element, via which the air guide device can be mounted on the rear region of the vehicle, having an air guide element, which can be displaced between a retracted rest position and an extended operating position; with a displacement device having a first displacement element and a second displacement element, via which the air control element can be moved between the rest position and the operating position, and having a closure device, via which a gap that is formed between the air guide element and the mounting element can be closed in the extended operating position of the air guide element. The closure device is designed as a flat textile structure which can be stretched to close the gap.

DE 10 2008 039 480 A1 discloses an air guide device in the rear region of a motor vehicle, in particular a passenger car having a spoiler, which can be displaced from a rest position into an operating position and vice versa by means of a control device. Arranged on the spoiler is a spoiler which can be adjusted in relation to a body of the motor vehicle and/or the spoiler, wherein the control movement of the trailing edge takes place essentially during the control movement of the spoiler and/or after the spoiler has reached its operating position.

DE 10 2014 104 157 A1 discloses a rear air guide device for a full-rear motor vehicle, which is arranged in the region of a rear edge of the roof above a rear window and comprises an air guide element which can be moved from a rest position into at least one active position. In addition, a gap sealing device is provided which seals a gap, which is present in the operative position, between a front edge of the air guide element and a body surface around which air flows during a driving operation.

SUMMARY OF INVENTION

Embodiments of the invention are based on the object of providing a rear air guide device for a vehicle which reduces impairment of rear view.

This object is achieved by a rear air guide device with the features as described herein. Additionally, advantageous configurations with expedient further developments of the invention are specified.

In order to provide a rear air guide device for a vehicle which reduces impairment of a rear view, at least one first air guide element is pivotably mounted between a first terminal position and a second terminal position, and, in the second terminal position, at least one second air guide element coupled to the at least one first air guide element spans a gap between the at least one first air guide element and the car body element. In addition, the body element is designed as a tailgate, wherein a first upper inflow surface of the at least one first air guide element prolongs an upper side of a roof element and an upper region of the tailgate in the first terminal position. In this case, the trailing edge of the air flow guided over a roof can advantageously be shifted to the rear in the first terminal position. In this case, the at least one first air guide element projects beyond a narrow region of the rear window. Furthermore, the first upper inflow surface of the at least one first air guide element can be arranged flush with the upper side of the roof element and the upper region of the tailgate. Due to the flush arrangement, a visually appealing continuous line of the roof can be created in both terminal positions. In addition, the occurrence of aerodynamically unfavorable turbulence in the rear region can advantageously be partially or completely prevented by such a flush arrangement.

In the following, an air guide element is understood to be a component running in the transverse direction of the vehicle, which displaces the rear trailing edge of the air flow to the rear, as a result of which a wake space behind the vehicle can be reduced.

The air guide device according to an embodiment of the invention can be used in particular on a sport utility vehicle (SUV) and on motor vehicles with a similar silhouette. These vehicles can have a hatchback, for example.

The at least one first air guide element can advantageously be pivoted by a control device. In this case, the pivot axis can run in the transverse direction of the vehicle and the control device can move the at least one first air guide element in a longitudinal vehicle-height plane. As a result of the pivoting movement of the at least one first air guide element from the first terminal position into the second terminal position and the spanning of the gap by the at least one second air guide element, the rear trailing edge of the air flow can, if necessary, be shifted, with little effort, backwards in the longitudinal direction of the vehicle, whereby the wake space can be reduced in size in an advantageous manner behind the vehicle. Since the at least one second air guide element is coupled to the first air guide element, the at least one second air guide element can be driven by the at least one first air guide element. In this case, the at least one first air guide element and the at least one second air guide element in the first terminal position can advantageously release a view to the rear through a rear window. In the second terminal position, the at least one first air guide element and the at least one second air guide element can improve the aerodynamics of the vehicle and thereby reduce fuel consumption and/or increase the range of the vehicle. In addition, the first terminal position of the at least one first air guide element and of the at least one second air guide element can correspond to a position in which the visual appearance of the vehicle is positively influenced. The second terminal position can be assumed in an advantageous manner, for example, when reaching a predetermined speed range.

In an advantageous embodiment of the air guide device according to an embodiment of the invention, the at least one first air guide element can abut against the car body element in the first terminal position and the at least one second air guide element can be arranged in a storage area. In this case, the at least one second air guide element can be connected to the car body element and to the at least one first air guide element. Because the at least one first air guide element rests against the car body element in the first terminal position and can be adapted to the car body element, the external appearance of the vehicle and a view to the rear can be only slightly or not at all negatively affected. In the second terminal position, the at least one first air guide element can advantageously be pivoted away from the car body element in order to improve the flow around the vehicle.

In a further advantageous embodiment of the air guide device according to an embodiment of the invention, the storage area can be arranged within the car body element or within the at least one first air guide element. In this way, flexible storage of the at least one second air guide element in the first terminal position, which is adapted to the vehicle model, can be created in an advantageous manner.

In a further advantageous embodiment of the air guide device according to an embodiment of the invention, in the second terminal position, the first upper inflow surface of the at least one first air guide element and a second upper inflow surface of the at least one second air guide element prolong the upper side of the roof element and the upper region of the tailgate. In this way, the trailing edge of the air flow extending over the roof can advantageously be shifted further back in the second terminal position in order to further improve the aerodynamics of the vehicle. In this case, the at least one first air guide element and the at least one second air guide element project beyond a greater region of the rear window than in the first terminal position. Since the second terminal position is preferably assumed at high speeds, the rearward view is advantageously only slightly restricted by the at least one first air guide element at low speeds, for example when parking or reversing or in heavy city traffic.

In a further advantageous embodiment of the air guide device according to an embodiment of the invention, the at least one first air guide element can be coupled to at least two vehicle-side bearings. The at least two vehicle-side bearings can be arranged on opposite sides of the vehicle and allow the at least one first air guide element to pivot about a pivot axis running between the two bearings in the transverse direction of the vehicle.

In an alternative embodiment of the air guide device according to an embodiment of the invention, the at least one first air guide element can be coupled to at least one rotatably mounted lever. In this case, the lever can advantageously be an element of a multi-joint hinge. For example, a first end region of the at least one lever can be mounted on the vehicle side and a second end region of the at least one lever can be mounted on the at least one first air guide element. By pivoting the at least one lever, the at least one first air guide element can advantageously be moved between the first terminal position and the second terminal position.

In a further advantageous embodiment of the air guide device according to an embodiment of the invention, the at least one first air guide element can be designed as a bracket having an L-shaped profile. The bracket can comprise two end regions, between which a center part extending in the transverse direction of the vehicle is arranged. The end regions can be coupled in an advantageous manner to the vehicle-side bearings.

In a further advantageous embodiment of the air guide device according to an embodiment of the invention, the at least one second air guide element can be designed as a flexible material web. For example, the flexible material web can consist of a convertible top material. In an advantageous manner, the flexible material web can simply be deposited in the storage area in the first terminal position. For example, the flexible material web can be attached to a winding roll arranged in the storage area and rolled up. Alternatively, the flexible material web can have specifically arranged seams which, with the aid of ropes, can lead to a desired folding of the flexible material web in the storage area.

The features and feature combinations mentioned above in the description, as well as the features and feature combinations mentioned below in the description of the figures and/or shown only in the figures, can be used not only in the respectively specified combination but also in other combinations or in isolation without getting out of the scope of the invention. Embodiments of the invention, which are not explicitly shown or explained in the figures but derive therefrom and can be produced by separated combinations of features from the embodiments explained, are thus to be regarded as included and disclosed.

BRIEF DESCRIPTION OF THE FIGURES

Embodiments of the invention are shown in the drawing and are explained in more detail in the following description. In the drawing, the same reference signs designate components or elements that perform the same or analogous functions. In the drawings.

DETAILED DESCRIPTION OF THE FIGURES

Figure 1:
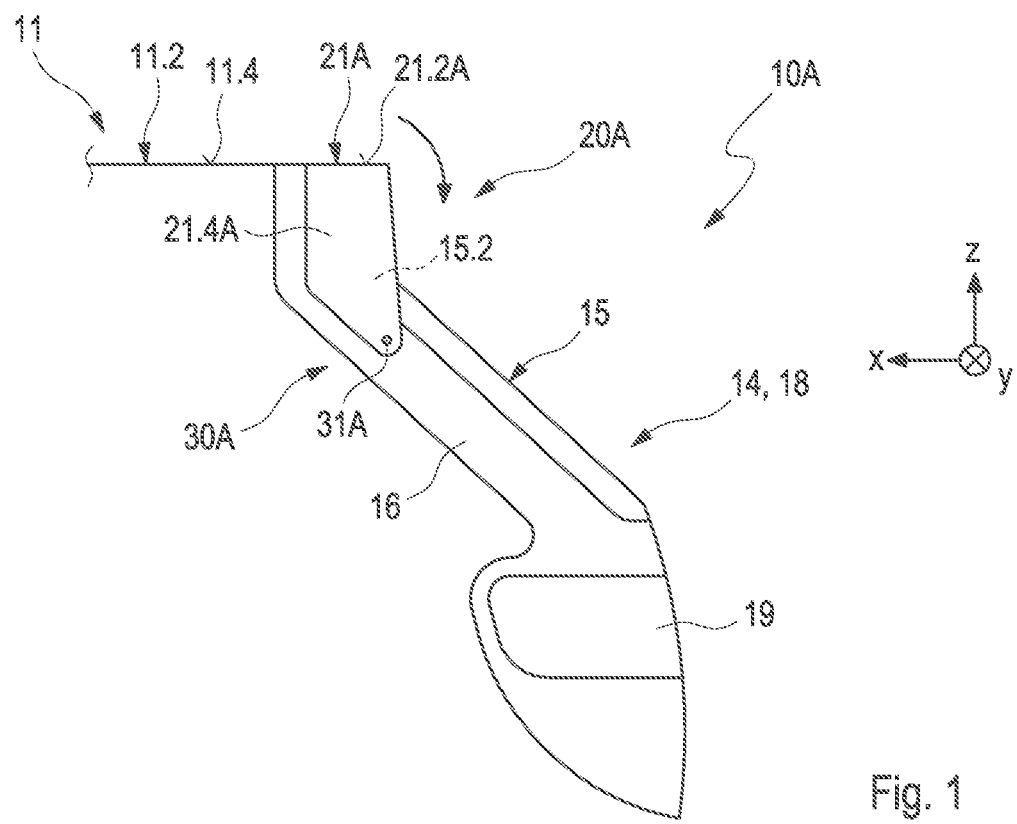
FIG. 1 is a schematic side view of a vehicle rear with a first embodiment of an air guide device according to an embodiment of the invention in a first terminal position.

As can be seen from FIGS. 1 to 4, a rear air guide device 20A, 20B for a vehicle comprises at least one first air guide element 21A, 21B, wherein a control device 30A, 30B moves the at least one first air guide element 21A, 21B between a first terminal position and a second terminal position in which it prolongs a car body element 18.

According to an embodiment of the invention, the at least one first air guide element 21A, 21B is mounted to pivot between the first terminal position and the second terminal position, and in the second terminal position at least one second air guide element 22 coupled to the at least one first air guide element 21A, 21B spans a gap 24 between the at least one first air guide element 21A, 21B and the car body element 18.

As can also be seen from FIGS. 1 to 4, the vehicle rear 10A, 10B comprises a roof 11 with an upper side 11.4, an air flow being guided on the upper side 11.4. In addition, the vehicle rear 10A, 10B comprises a tailgate 14 which comprises a rear window 15. The rear window 15 is laterally bounded by two side frame elements 16 extending in the vertical direction z of the vehicle. In addition, the vehicle rear 10A, 10B comprises at least one rear light 19 and the air guide device 20A, 20B according to an embodiment of the invention on each vehicle side.

As can also be seen from FIGS. 1 to 4, the air guide device 20A, 20B according to an embodiment of the invention comprises a first air guide element 21A, 21B and a second air guide element 22 in each case in the illustrated embodiments. In an alternative embodiment (not shown), the air guide device 20A, 20B according to an embodiment of the invention can also have further air guide elements. From the control device 30A; 30B, only the bearings 31A, 34B, 36B and, if present, the levers 31B, 32B are shown. The control device 30A, 30B can also have a drive (not shown).

Figure 3:
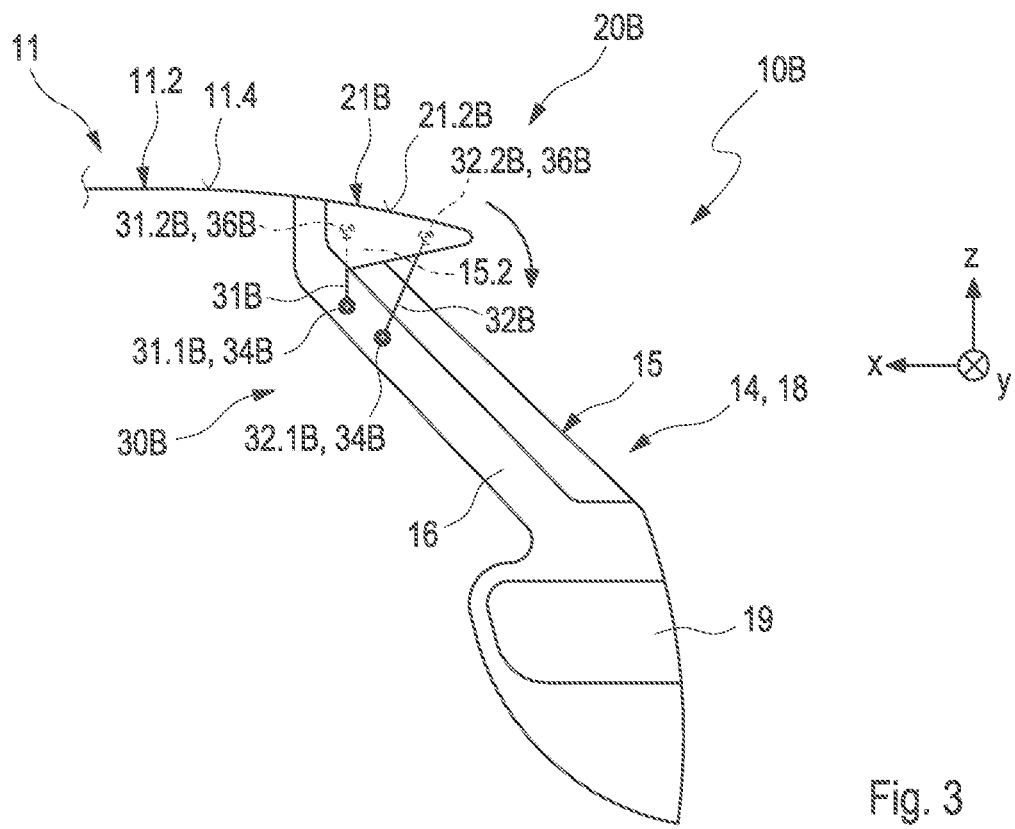
FIG. 3 is a schematic side view of a vehicle rear with a second embodiment of an air guide device according to an embodiment of the invention in a first terminal position.

As can also be seen from FIGS. 1 and 3, the first air guide element 21A, 21B abuts against the car body element 18 in the first terminal position. The second air guide element 22 is arranged in the first terminal position in a storage area, not shown. The storage area can be arranged within the car body element 18 or within the first air guide element 21A, 21B. The storage area is preferably arranged within the first air guide element 21A, 21B in order to save installation space on the body. In the illustrated embodiments of the air guide device 20A, 20B according to an embodiment of the invention, the car body element 18, on which the first air guide element 21A, 21B abuts in the first terminal position, is designed as a tailgate 14. A first upper inflow surface 21.2A, 21.2B of the first air guide element 21A, 21B prolongs an upper side 11.4 of a roof element 11.2 and an upper region of the tailgate 14, the first upper inflow surface 21.2A, 21.2B being arranged flush with the upper side 11.4 of the roof element 11.2 and with the upper region of the tailgate 14. As a result, the trailing edge of the air flow guided over the roof 11 is shifted to the rear in the first terminal position. In this case, the first air guide element 21A, 21B projects beyond a narrow upper edge region 15.2 of the rear window 15.

As can also be seen from FIGS. 1 to 4, the illustrated embodiments of the air guide device 20A, 20B can differ according to the shape of the first air guide element 21A, 21B. In the first embodiment of the air guide device 20A according to an embodiment of the invention shown in FIGS. 1 and 2, the first air guide element 21A is designed as a bracket having an L-shaped profile which has two end regions 21.4A. The first air guide element 21A has a central part between the end regions. In the second embodiment of the air guide device 20B according to an embodiment of the invention shown in FIGS. 3 and 4, the first air guide element 21B is designed as an extension of the roof element 11.2 and the tailgate 14 and has a V-shaped cross section, the narrow terminal region being aligned towards the rear and the wide terminal region facing the roof element 11.2 or the tailgate 14.

Figure 2:
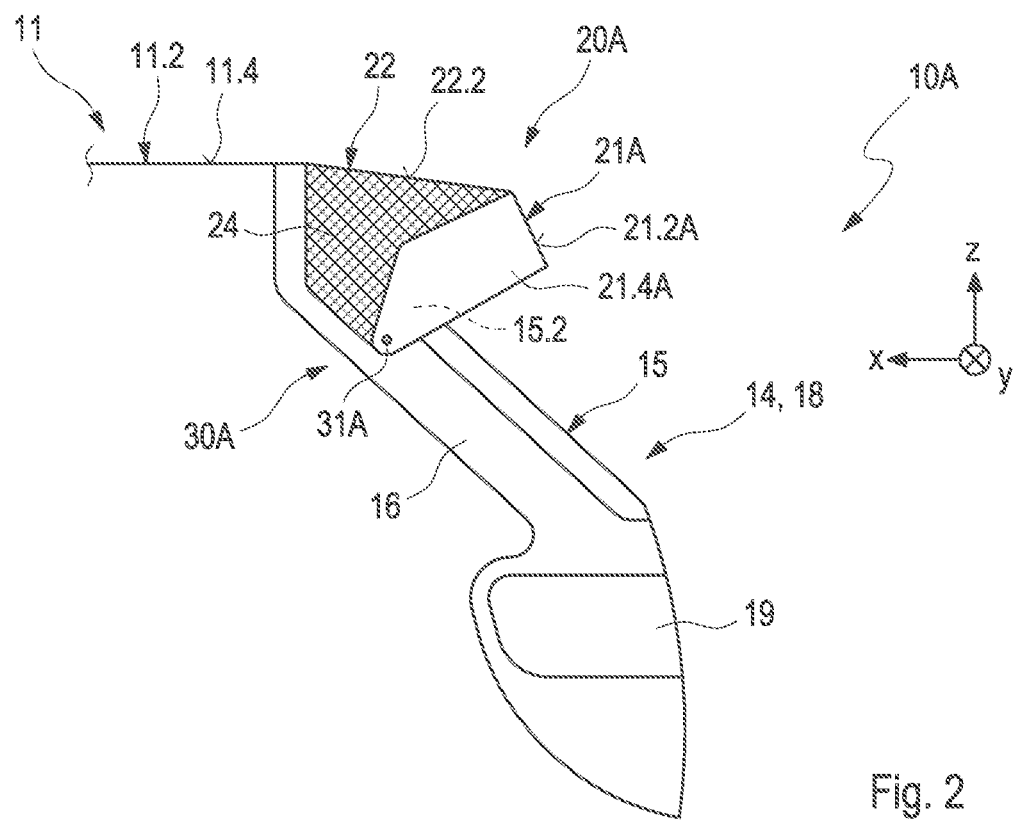
FIG. 2 is a schematic side view of the vehicle rear from FIG. 1 with the air guide device according to an embodiment of the invention in a second terminal position.
Figure 4:
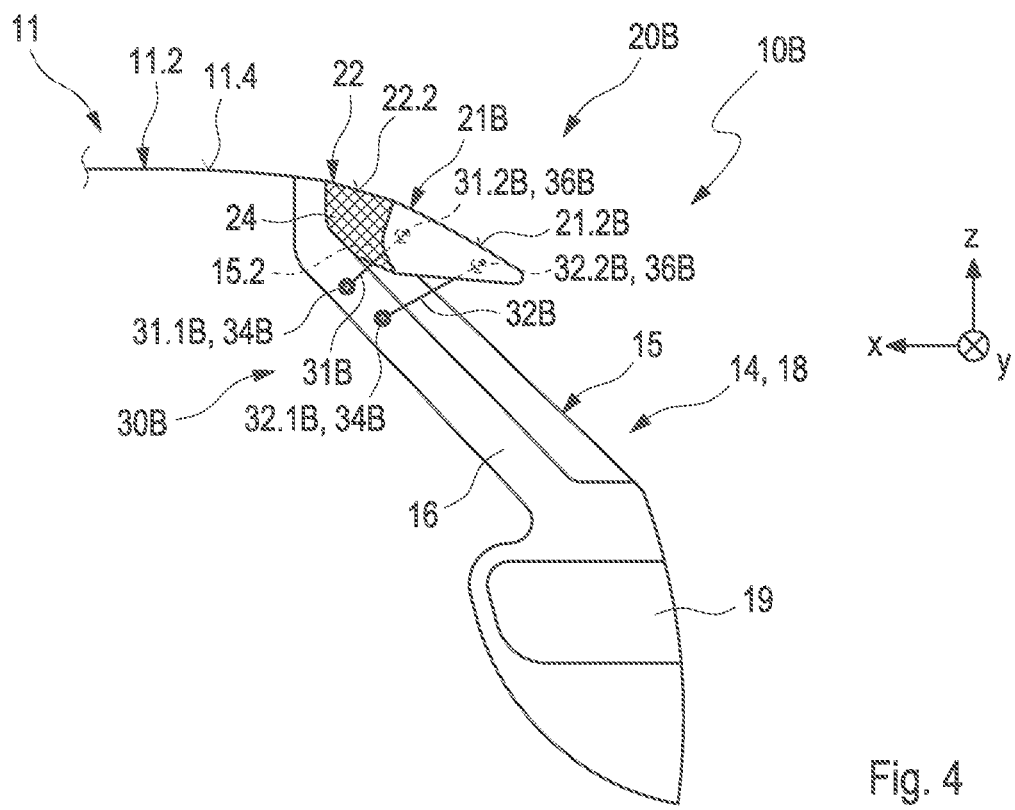
FIG. 4 is a schematic side view of the vehicle rear from FIG. 3 with the air guide device according to an embodiment of the invention in a second terminal position.

As can also be seen from FIGS. 2 and 4, in the second terminal position, the second air guide element 22 spans a gap 24 between the first air guide element 21A, 21B and the car body element 18. In the illustrated embodiments of the air guide device 20A, 20B according to an embodiment of the invention, the at least one second air guide element 22 is connected to a car body element 18 and to the first air guide element 21A, 21B. When the first air guide element 21A, 21B is pivoted from the first terminal position into the second terminal position, the first air guide element 21A, 21B moves, at least in portions, away from the tailgate 14. Since the second air guide element 22 is connected to the first air guide element 21A, 21B, the second air guide element 22 is drawn along and moved out of the storage area. The second air guide element 22 is designed as a flexible material web in the illustrated embodiment. A convertible top material can preferably be used as a flexible material web, which is rolled up in the storage area on a winding roll, not shown. The winding roll is acted upon by means of a spring arrangement in such a way that it tightens the material web.

As can also be seen from FIGS. 2 and 4, in the second terminal position, the first upper inflow surface 21.2A, 21.2B of the first air guide element 21A, 21B and a second upper inflow surface 22.2 of the second air guide element 22 prolong the upper side 11.4 of the roof element 11.2 and the upper region of the tailgate 14. As a result, the trailing edge of the air flow guided over the roof 11 is displaced further back in the second terminal position than in the first terminal position. In addition, the first air guide element 21A, 21B and the second air guide element 22 project beyond a greater upper edge region 15.2 of the rear window 15 than in the first terminal position. The first air guide element 21A, 21B and the second air guide element 22 are converted into the second terminal position or into the first terminal position by the control device 30A, 30B as required, in particular at predetermined speeds.

As can also be seen from FIGS. 1 and 2, the control device 30A in the illustrated first embodiment of the air guide device 20A according to an embodiment of the invention has two vehicle-side bearings 31A to which the first air guide element 21A is coupled. Only one of the two bearings 31A is visible. The two bearings 31A are arranged on the side frame elements 16, respectively. The pivot axis runs in the transverse direction y of the vehicle between the two bearings 31A. The two terminal regions 21.4A of the first air guide element 21A can be pivoted on the respective bearing 31A.

As can also be seen from FIGS. 3 and 4, the control device 30B in the illustrated second embodiment of the air guide device 20B according to an embodiment of the invention has multi-joint hinges which are arranged at least at the terminal regions of the first air guide element 21B. In the embodiment shown, the multi joint hinge corresponds to a four-joint hinge with two levers 31B, 32B and four bearings 34B, 36B, a first lever 31B being arranged in front of a second lever 32B in the direction of travel x. A first terminal region 31.1B, 32.1B of the levers 31B, 32B is each mounted on the vehicle side on a corresponding first bearing 34B and a second terminal region 31.2B, 32.2 of the levers 31B, 32B is each mounted on a corresponding second bearing 36B on the first air guide element 21B. By pivoting the levers 31B, 32B, the first air guide element 21B is moved between the first terminal position and the second terminal position. In this case, the first upper inflow surface 21.2B of the first air guide element 21B is also arranged in the second terminal position flush with the upper side 11.4 of the roof element 11.2 or with the upper region of the tailgate 14. In an alternative embodiment (not shown), of the air guide device 20A, 20B according to an embodiment of the invention, the first air guide element 21B can only be coupled to a rotatably mounted lever 31B, 32B. Alternatively or additionally, at least one lever 31B, 32B can be constructed in multiple parts, with two terminal regions facing one another being connected to one another via a joint.

LIST OF REFERENCE SIGNS

10A, 10B Vehicle rear
11 Roof
11.2 Roof element
11.4 Upper side
14 Tailgate
15 Rear window
15.2 Upper edge region (is overlaid by the air guide element)
16 Side frame elements
18 Car body element
19 Rear light
20A, 20B Air guide device
21A, 21B First air guide element
21.2A, 21.2B First upper inflow surface
21.4A End region
22 Second air guide element
22.2 Second upper inflow surface
24 Gap
30A, 30B Control device
31A Bearing
31B First lever
32B Second lever
31.1B, 32.1B First terminal region
31.2B, 32.2B Second terminal region
34B First bearing
36B Second bearing

The invention claimed is:

1. A vehicle comprising:
a car body element comprising a tailgate having a roof element disposed at an upper region of the tailgate; and
a rear air guide device comprising:
a first air guide element pivotably coupled to the car body element such that the first air guide element is configured to pivot between a first terminal position and a second terminal position,
a second air guide element coupled to the first air guide element, and
a control device configured to move the first air guide element between the first terminal position and the second terminal position,
wherein when the first air guide element is set at the first terminal position, a first upper inflow surface of the first air guide element is arranged flush with an upper side of the roof element such that the first upper inflow surface and the upper side define a continuous surface,
wherein when the first air guide element is set at the second terminal position, the first upper inflow surface is separated from the roof element by a gap,
wherein the second air guide element spans the gap between the first upper inflow surface and the roof element when the first air guide element is set at the second terminal position.

2. The vehicle according to claim 1, wherein when the first air guide element is set at the first terminal position, the first air guide element abuts against the car body element and the second air guide element is disposed in a storage area of the vehicle.

3. The vehicle according to claim 2, wherein the storage area is arranged within the car body element or within the first air guide element.

4. The vehicle according to claim 1, wherein when the first air guide element is set at the second terminal position, the first upper inflow surface and a second upper inflow surface of the second air guide element are arranged flush with the upper side of the roof element.

5. The vehicle according to claim 1, wherein the first air guide element is coupled to the car body element by two vehicle-side bearings.

6. The vehicle according to claim 1, wherein the first air guide element is coupled to the car body element by a rotatably mounted lever.

7. The vehicle according to claim 6, wherein the rotatably mounted lever includes a first terminal region mounted on the car body element and a second end region mounted on the first air guide element.

8. The vehicle according to claim 1, wherein the first air guide element comprises a bracket having an L-shaped profile.

9. The vehicle according to claim 1, wherein the second air guide element comprises a flexible material web.

* * * * *